US012609300B2

(12) United States Patent
Chung et al.

(10) Patent No.: US 12,609,300 B2
(45) Date of Patent: Apr. 21, 2026

(54) ANODE ACTIVE MATERIAL AND LITHIUM SECONDARY BATTERY INCLUDING THE SAME

(71) Applicant: SK ON CO., LTD., Seoul (KR)

(72) Inventors: Ju Ho Chung, Daejeon (KR); Jik Soo Kim, Daejeon (KR); Gwi Ok Park, Daejeon (KR)

(73) Assignee: SK ON CO., LTD., Seoul (KR)

( * ) Notice: Subject to any disclaimer, the term of this patent is extended or adjusted under 35 U.S.C. 154(b) by 782 days.

(21) Appl. No.: 17/945,044

(22) Filed: Sep. 14, 2022

(65) Prior Publication Data

US 2023/0084565 A1    Mar. 16, 2023

(30) Foreign Application Priority Data

Sep. 14, 2021    (KR) ........................ 10-2021-0122147

(51) Int. Cl.
| | |
|---|---|
| *H01M 4/36* | (2006.01) |
| *H01M 4/133* | (2010.01) |
| *H01M 4/38* | (2006.01) |
| *H01M 4/587* | (2010.01) |
| *H01M 4/62* | (2006.01) |
| *H01M 10/0525* | (2010.01) |
| *H01M 10/0562* | (2010.01) |
| *H01M 4/02* | (2006.01) |
| *H01M 10/0568* | (2010.01) |
| *H01M 10/0569* | (2010.01) |

(52) U.S. Cl.
CPC ........... *H01M 4/366* (2013.01); *H01M 4/386* (2013.01); *H01M 4/587* (2013.01); *H01M 4/62* (2013.01); *H01M 10/0525* (2013.01); *H01M 10/0562* (2013.01); *H01M 2004/021* (2013.01); *H01M 2004/027* (2013.01); *H01M 10/0568* (2013.01); *H01M 10/0569* (2013.01); *H01M 2300/0042* (2013.01); *H01M 2300/0068* (2013.01)

(58) Field of Classification Search
CPC ...... H01M 4/366; H01M 4/386; H01M 4/587; H01M 4/62; H01M 10/0562; H01M 2004/027; H01M 4/133
See application file for complete search history.

(56) References Cited

U.S. PATENT DOCUMENTS

2013/0344391 A1* 12/2013 Yushin .................. H01M 4/386
                                                             429/218.1
2016/0351973 A1* 12/2016 Albano ................. H01M 4/628

FOREIGN PATENT DOCUMENTS

| CN | 110034280 A | * | 7/2019 | ............. B82Y 30/00 |
|---|---|---|---|---|
| CN | 110071280 A | | 7/2019 | |
| CN | 111430676 A | | 7/2020 | |

(Continued)

OTHER PUBLICATIONS

Extended European Search Report for European Patent Application No. 22194985.2, mailed Jan. 25, 2023 (7 pages).

*Primary Examiner* — Ula C Ruddock
*Assistant Examiner* — Sydney L Kline
(74) *Attorney, Agent, or Firm* — Perkins Coie LLP

(57) ABSTRACT

An anode active material for a lithium secondary battery includes a core portion including a solid electrolyte, and a shell portion encapsulating the core portion and including a silicon-based active material. A lithium secondary includes a case and an electrode assembly accommodated in the case. The electrode assembly includes an anode including the anode active material and a cathode facing the anode.

17 Claims, 4 Drawing Sheets

(a)

(b)

(56)          References Cited

FOREIGN PATENT DOCUMENTS

| | | | | | |
|---|---|---|---|---|---|
| CN | 111435733 | A | * | 7/2020 | ........ H01M 10/0525 |
| JP | 2020-198254 | A | | 12/2020 | |
| KR | 10-2020-0015384 | A | | 2/2020 | |
| KR | 10-2114044 | B | | 5/2020 | |
| KR | 10-2158221 | B1 | | 9/2020 | |
| KR | 10-2192087 | B1 | | 12/2020 | |

* cited by examiner

ANODE ACTIVE MATERIAL AND LITHIUM SECONDARY BATTERY INCLUDING THE SAME

PRIORITY CLAIM AND CROSS-REFERENCE TO RELATED APPLICATION

This patent document claims the priority and benefits of Korean Patent Application No. 10-2021-0122147 filed at the Korean Intellectual Property Office (KIPO) on Sep. 14, 2021, the entire disclosure of which is incorporated herein by reference.

TECHNICAL FIELD

This patent document generally relates to an anode active material and a lithium secondary battery including the same.

BACKGROUND

The rapid growth of electric vehicles and portable devices, such as camcorders, mobile phones, and laptop computers, has brought increasing demands for secondary batteries which can be charged and discharged repeatedly.

Examples of the secondary batteries include lithium secondary batteries, nickel-cadmium batteries, and nickel-hydrogen batteries. The lithium secondary batteries are now widely used due to certain advantages over other types of batteries, including, e.g., high operational voltage and energy density per unit weight, a high charging rate, a compact dimension, etc.

A lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

SUMMARY

The technology disclosed in this patent document can be implemented in some embodiments to provide an anode active material having improved life-span property.

The technology disclosed in this patent document can also be implemented in some embodiments to provide a lithium secondary battery including an anode active material having improved life-span property.

In some embodiments of the disclosed technology, an anode active material includes a core portion including a solid electrolyte, and a shell portion encapsulating the core portion and including a silicon-based active material.

In some embodiments, the shell portion may completely surround a surface of the core portion.

In some embodiments, the solid electrolyte may contain an oxide-based solid electrolyte or a sulfide-based solid electrolyte.

In some embodiments, the oxide-based solid electrolyte may include at least one selected from the group consisting of an LIPON compound, a perovskite-based compound, a NASICON compound, a garnet-type compound, glass, a phosphoric acid-based compound and a crystalline oxide. In some implementations, the term "LIPON compound" can be used to indicate a lithium phosphorus oxynitride compound. In some implementations, the term "NASICON" can be used to indicate a sodium (Na) super ionic conductor.

In some embodiments, the sulfide-based solid electrolyte may include at least one selected from the group consisting of a thio-LISICON compound, an LGPS compound, an LPS compound, $30Li_2S \cdot 26B_2S_3 \cdot 44LiI$, $63Li_2S \cdot 36SiS_2 \cdot 1Li_3PO_4$, $57Li_2S \cdot 38SiS_2 \cdot 5Li_4SiO_4$, $70Li_2S \cdot 30P_2S_5$, $50Li_2S \cdot 50GeS_2$, $Li_2S—P_2S_5$, $Li_2S—SiS_2$, $LiI—Li_2S—SiS_2$, $LiI—Si_2S—P_2S_5$, $LiI—LiBr—Li_2S—P_2S_5$, $LiI—Li_2S—P_2S_5$, $LiI—Li_2O—Li_2SP_2S_5$, $LiI—Li_2S—P_2O_5$, $LiI—Li_3PO_4—P_2S_5$, $Li_2S—P_2S_5—GeS_2$, $Li_2S—P_2S_5—LiCl$, $LiI—Li_2S—B_2S_3$, $Li_3PO_4—Li_2S—Si_2S$, $Li_3PO_4—Li_2S—SiS_2$ and $LiPO_4—Li_2S—SiS$.

In some embodiments, an ionic conductivity of the solid electrolyte may be $1 \times 10^{-4}$ S/cm or more.

In some embodiments, the solid electrolyte may have an average particle diameter $(D_{50})$ in a range from 1 μm to 10 μm.

In some embodiments, the silicon-based active material may include a silicon particle, a silicon-carbon composite, silicon oxides and/or a silicon alloy.

In some embodiments, the shell portion may have a thickness in a range from 0.5 μm to 10 μm.

In some embodiments, the shell portion may further include a carbon-based active material.

In some embodiments, a content of the carbon-based active material contained in the shell portion may be in a range from 2 parts by weight to 20 parts by weight based on 100 parts by weight of the shell portion.

In some embodiments, the carbon-based active material may include activated carbon, carbon nanotube (CNT), carbon nano-wire, graphene, carbon fiber, carbon black, graphite, hard carbon, soft carbon and/or porous carbon.

In some embodiments, the shell portion may further include a carbon coating layer.

In some embodiments of the disclosed technology, a lithium secondary battery includes a case and an electrode assembly accommodated in the case. The electrode assembly includes an anode including the anode active material for a lithium secondary battery according to the above-described embodiments, and a cathode facing the anode.

In some embodiments, the lithium secondary battery may further include a liquid electrolyte injected into the case.

In an anode active material according to exemplary embodiments of the disclosed technology, a core portion including a solid electrolyte may be completely included within a shell portion including a silicon-based active material and may not be exposed to an outside at an initial stage of a life-span. As the life-span progresses, cracks may occur in the shell portion including the silicon-based active material, and the solid electrolyte of the core portion may newly participate in a reaction. Accordingly, a consumed electrolyte may be replenished to improve life-span properties of the lithium secondary battery.

DETAILED DESCRIPTION OF THE EMBODIMENTS

With increasing demand for high-capacity, high-power lithium secondary batteries, a silicon-containing active material having a high capacity is being applied as an anode active material. The silicon-based active material has a large theoretical capacity, but a large volume expansion may occur while the lithium secondary battery is being charged. Such a volume expansion can cause cracks in the active material and side reactions of the electrolyte may occur on the cracked surface.

According to exemplary embodiments of the disclosed technology, an anode active material includes a core portion containing a solid electrolyte, and a shell portion capsulating the core portion and containing a silicon-based active material. In addition, an anode for a lithium secondary battery and a lithium secondary battery include the anode active material.

An anode active material for a lithium secondary battery using a silicon-based active material may have a remarkably greater theoretical capacity than that of a graphite-based active material. However, the silicon-based active material may have a large volume expansion ratio while being charged, and thus cracks may occur due to repeated expansion and contraction during repeated charge/discharge.

Accordingly, a surface area of the anode active material may be increased, and an electrolyte included in a battery may react with a newly increased surface area to be rapidly consumed. Further, side reactions such as a gas generation may occur during the reaction, thereby degrading life-span properties of the battery.

According to embodiments of the disclosed technology, the anode active material may include a core portion including a solid electrolyte, and a surface of the core portion may be encapsulated by a silicon-based active material to form a shell portion. In some embodiments, the shell portion may be formed to completely surround the surface of the core portion.

Figure 1:
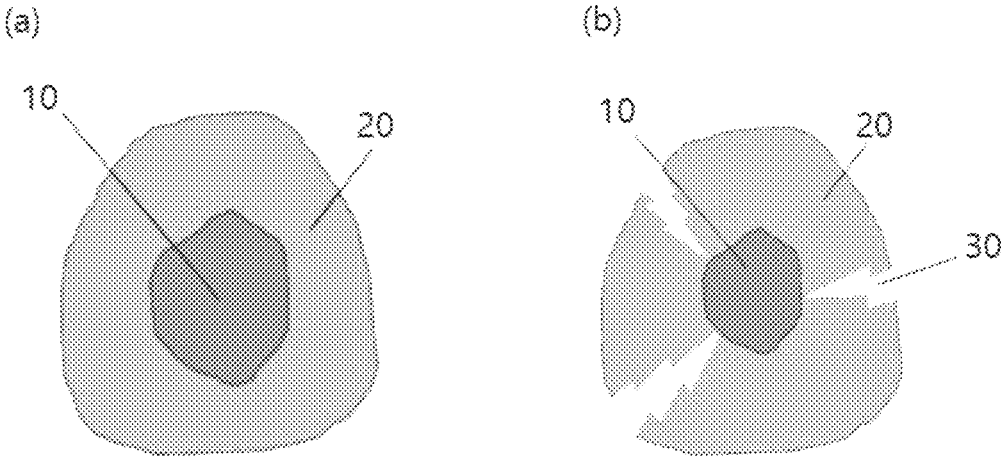
FIG. 1 is a schematic cross-sectional view illustrating an anode active material according to exemplary embodiments.

FIG. 1 is a schematic cross-sectional view illustrating an anode active material according to exemplary embodiments.

Referring to FIG. 1, in an initial stage of life-span, a core portion 10 including the solid electrolyte may be completely covered or surrounded by a shell portion 20 including the silicon-based active material and may not be exposed to an outside (see (a) of FIG. 1). When cracks 30 is generated in the shell portion 20 as charging/discharging proceeds through a battery reaction, the solid electrolyte of the core portion 20 present within an anode active material particle may newly participate in the reaction (see (b) of FIG. 1). Accordingly, the electrolyte consumed during the charging/discharging may be replenished to improve the life-span properties of the lithium secondary battery.

In exemplary embodiments, the solid electrolyte may include an oxide-based solid electrolyte and/or a sulfide-based solid electrolyte. In a preferable embodiment, the sulfide-based solid electrolyte may be used.

Non-limiting examples of the oxide-based solid electrolyte may include a LIPON compound such as $Li_{2.9}PO_{3.3}N_{0.46}$, etc., a perovskite compound such as $La_{0.51}Li_{0.34}TiO_{2.94}$ (LLTO), etc., a NASICON compound such as $Li_{1.3}Al_{0.3}Ti_{1.7}(PO_4)_3$ (LATP), etc., a garnet type compound such as $Li_7La_3Zr_2O_{12}$ (LLZO), etc., a glass such as $50Li_4SiO_4 \cdot 50Li_3BO_3$, a phosphoric acid-based compound such as $Li_{1.07}Al_{0.69}Ti_{1.46}(PO_4)_3$, $Li_{1.5}Al_{0.5}Ge_{1.5}(PO_4)_3$, etc., and a crystalline oxide such as $Li_{3.6}Si_{0.6}P_{0.4}O_4$. These may be used alone or in combination thereof.

Non-limiting examples of the sulfide-based solid electrolyte may include a thio-LISICON-type compound such as $Li_{3.25}Ge_{0.25}P_{0.75}S_4$, etc., an LGPS-type compound such as $Li_{10}GeP_2S_{12}$, $Li_{3.25}Ge_{0.25}P_{0.75}S_4$, etc., an LPS-type compound such $Li_7P_3S_{11}$, $Li_{3.25}P_{0.95}S_4$, $Li_3PS_4$, etc., $30Li_2S \cdot 26B_2$ $S_3 \cdot 44LiI$, $63Li_2S \cdot 36SiS_2 \cdot 1Li_3PO_4$, $57Li_2S \cdot 38SiS_2 \cdot 5Li_4SiO_4$, $70Li_2S \cdot 30P_2S_5$, $50Li_2S \cdot 50GeS_2$, $Li_2S—P_2S_5$, $Li_2S—SiS_2$, $LiI—Li_2S—SiS_2$, $LiI—Si_2S—P_2S_5$, $LiI—LiBr—Li_2S—P_2S_5$, $LiI—Li_2S—P_2S_5$, $LiI—Li_2O—Li_2SP_2S_5$, $LiI—Li_2S—P_2O_5$, $LiI—Li_3PO_4—P_2S_5$, $Li_2S—P_2S_5—GeS_2$, $Li_2S—P_2S_5—LiCl$, $LiI—Li_2S—B_2S_3$, $Li_3PO_4—Li_2S—Si_2S$, $Li_3PO_4—Li_2S—SiS_2$, $LiPO_4—Li_2S—SiS$, etc. These may be used alone or in combination thereof.

In some embodiments, an ionic conductivity of the solid electrolyte may be $1 \times 10^{-4}$ S/cm or more. Preferably, the ionic conductivity of the solid electrolyte may be $5 \times 10^{-4}$ S/cm or more, more preferably $1 \times 10^{-3}$ S/cm or more. In the above range of the ionic conductivity, an ion transfer between the anode and the cathode may be promoted to reduce an internal resistance between the anode and the cathode. Accordingly, power properties of the lithium secondary battery may be improved.

The ionic conductivity may be measured at room temperature, e.g., about 25° C. using a DC polarization method, or may be measured using a complex impedance method.

In some embodiments, an average particle diameter ($D_{50}$) of the solid electrolyte may be in a range from 1 μm to 10 μm, preferably from 3 μm to 7 μm. An appropriate amount of the solid electrolyte may be obtained in the particle size range, so that life-span property and energy density of the secondary battery may be improved.

The "average particle diameter (D50)" refers to a value of a particle diameter corresponding to 50% from a smallest particle based on 100% of the total number of particles in a cumulative distribution curve of particle sizes. The average particle diameter (D50) may be measured by a widely known method.

For example, the average particle size may be measured using a particle size analyzer, or may be measured from a TEM image or an SEM image. The average particle size may also be measured by a measurement using a dynamic light-scattering method, or may be calculated after counting the number of particles for each particle size range using a data analysis.

In some embodiments, the silicon-based active material may include a silicon particle, a silicon-carbon composite, a silicon oxide, a silicon alloy, or the like. These may be used alone or in combination thereof.

The silicon particles may be present in the form of primary particles or a secondary particle formed by agglomeration of the primary particles. The silicon-carbon composite may include silicon particles and/or carbon-silicon composite particles dispersed in a carbon matrix.

The silicon oxide may be represented as, e.g., SiOx ($0<x<2$). The silicon alloy may include, e.g., a Si—Z' alloy (wherein Z' is at least one element selected from an alkali metal, an alkaline earth metal, a group 13 element, a group 14 element, a transition metal, a rare earth element, or a combinations thereof, and Si may be excluded therefrom).

In some embodiments, a thickness of the shell portion may be in a range from 0.5 μm to 10 μm, preferably from 0.7 μm to 7 μm, more preferably from 1 μm to 5 μm. For example, if the thickness of the shell portion is less than 0.5 μm, cracks may occur in the shell portion in a pressing process for fabricating an electrode and the solid electrolyte in the core portion may be exposed.

For example, if the thickness of the shell portion exceeds 10 μm, a volume expansion ratio of the anode active material may be excessively increased, and cracks may easily occur due to repeated charging and discharging. In this case, electrical contact properties between the anode active materials may be deteriorated, or electrolyte consumption may be accelerated through the cracks. Further, an amount of the silicon-based active material may be excessively increased, and thus a consumed amount of the electrolyte may be greater than a replenished amount of the solid electrolyte.

In exemplary embodiments, the shell portion may further include a carbon-based active material. Accordingly, electrical conductivity and durability of the anode active material may be enhanced, and thus the power and life-span properties of the lithium secondary battery may be improved.

Non-limiting examples of the carbon-based active material may include graphite particles having artificially formed pores, or a carbon body (pyrolytic carbon) manufactured by fining a carbon precursor such as pitch to form pores therein.

In some embodiments, the carbon-based active material may include an amorphous structure or a crystalline structure. Preferably, the carbon-based active material may have an amorphous structure.

In some embodiments, the carbon-based active material may include activated carbon, carbon nanotube (CNT), carbon nano-wire, graphene, carbon fiber, carbon black, graphite, hard carbon, soft carbon, porous carbon (micro/meso/macro porous carbon), etc. These may be used alone or in a combination thereof.

In exemplary embodiments, the shell portion may further include a carbon coating layer. In this case, direct exposure of silicon in the silicon-based coating layer to an electrolyte solution may be prevented, and thus the side reaction with the electrolyte solution may be reduced. Accordingly, volume expansion during charging and discharging of the secondary battery may be suppressed, and the life-span properties of the lithium secondary battery may be further improved.

In some embodiments, a content of the carbon coating layer may be in a range from 2 parts by weight to 20 parts by weight based on 100 parts by weight of a total weight of the shell portion.

For example, a thickness of the carbon coating layer may be in a range from 0.001 μm to 10 μm, preferably from 0.01 μm to 5 μm, and more preferably from 0.01 μm to 1 μm. In the above thickness range, the shell portion including the silicon-based active material may be prevented from a direct contact with the electrolyte.

Figure 2:
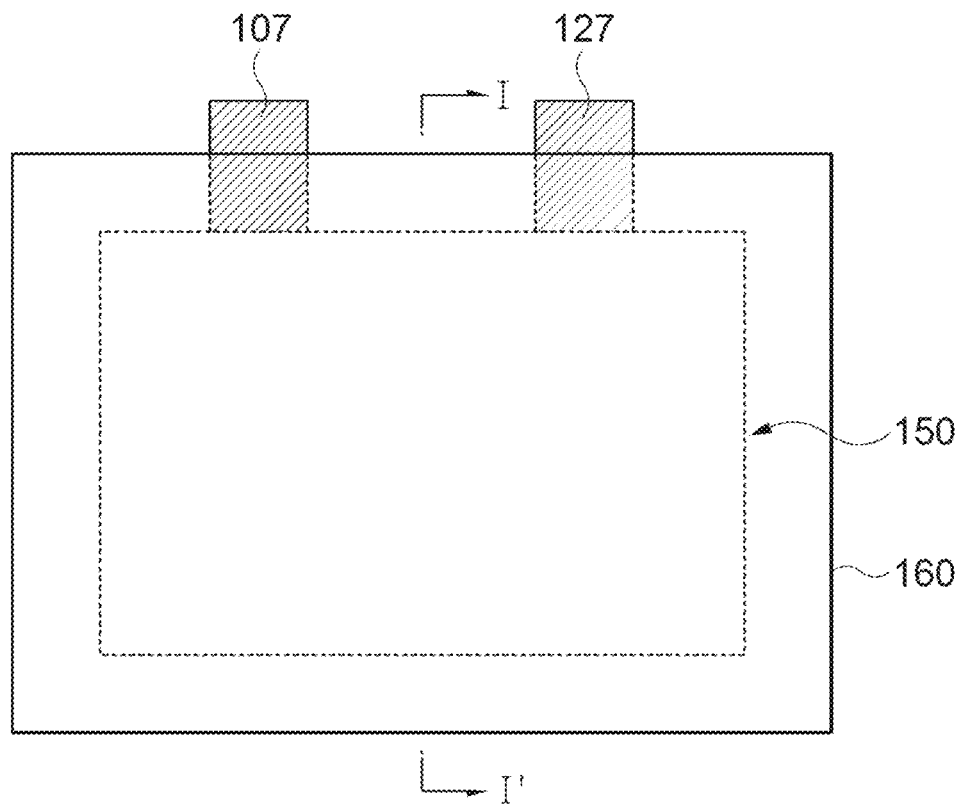
FIG. 2 is a schematic top plan view illustrating a lithium secondary battery according to exemplary embodiments.
Figure 3:
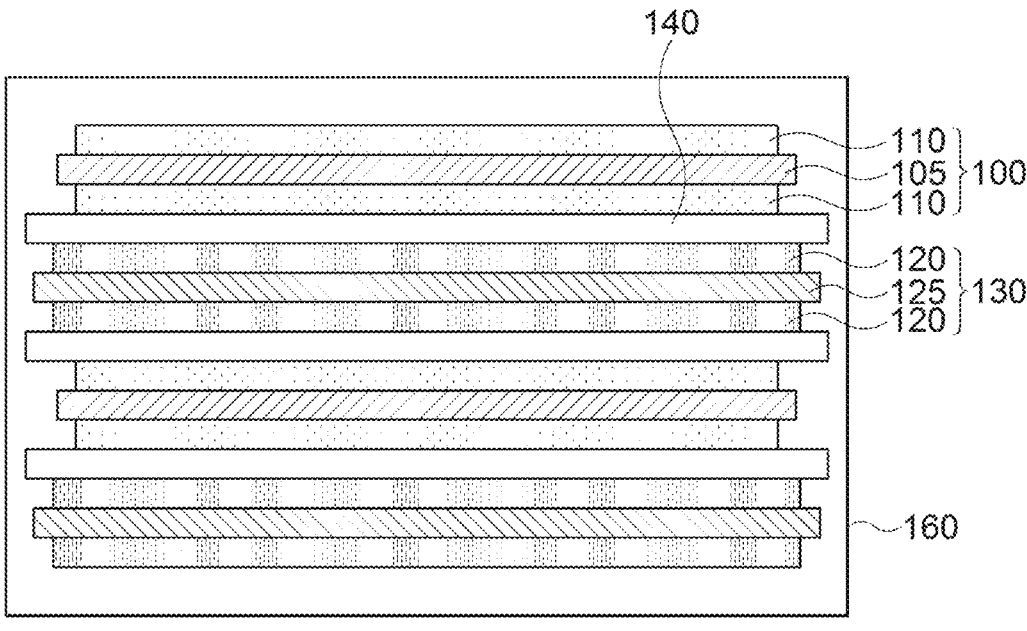
FIG. 3 is a schematic cross-sectional view illustrating a lithium secondary battery according to exemplary embodiments.

FIGS. 2 and 3 are a schematic top plan view and a schematic cross-sectional view, respectively, illustrating a lithium secondary battery according to exemplary embodiments.

The lithium secondary battery may include an anode including the anode active material as described above.

Referring to FIGS. 2 and 3, the lithium secondary battery may include an electrode assembly including a cathode 100, an anode 130, and a separation layer 140 interposed between the cathode and the anode. The electrode may be accommodated and impregnated with an electrolyte in the case 160.

The cathode 100 may include a cathode active material layer 110 formed by coating a mixture including a cathode active material on a cathode current collector 105.

The cathode current collector 105 may include, e.g., stainless steel, nickel, aluminum, titanium, copper, or an alloy thereof, and may preferably include aluminum or an aluminum alloy.

The cathode active material may include a compound capable of reversibly intercalating and de-intercalating lithium ions. In some embodiments, the cathode active material may include a lithium-transition metal oxide. For example, the lithium-transition metal oxide may include nickel (Ni), and may further include at least one of cobalt (Co) and manganese (Mn).

For example, the lithium-transition metal oxide may be represented by Chemical Formula 1 below.

$$\text{Li}_x\text{Ni}_{1-y}\text{M}_y\text{O}_{2+z} \qquad \text{[Chemical Formula 1]}$$

In Chemical Formula 1, $0.9 \leq x \leq 1.1$, $0 \leq y \leq 0.7$, and $-0.1 \leq z \leq 0.1$. M may be at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn or Zr.

In some embodiments, a molar ratio or concentration of Ni (1−y) in Chemical Formula 1 may be 0.8 or more, and may exceed 0.8 in a preferable embodiment.

The mixture may be prepared by mixing and stirring the cathode active material with a binder, a conductive material and/or a dispersive agent in a solvent. The mixture may be coated on the cathode current collector 105, and then dried and pressed to from the cathode 100.

The solvent may include, e.g., a non-aqueous solvent such as N-methyl-2-pyrrolidone (NMP), dimethylformamide, dimethylacetamide, N,N-dimethylaminopropylamine, ethylene oxide, tetrahydrofuran, etc.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be further improved.

The conductive material may be included to promote an electron mobility between particles of the active material. For example, the conductive material may include a carbon-based conductive material such as graphite, carbon black, graphene, carbon nanotube, etc., and/or a metal-based material, e.g., tin, tin oxide, titanium oxide a perovskite material such as LaSrCoO3, LaSrMnO3, etc.

In exemplary embodiments, an anode slurry may be prepared using the above-described anode active material. For example, the anode active material may be mixed with an anode binder, a conductive material and a thickener in a solvent to form the anode slurry.

For example, the anode binder may include a polymer material such as styrene-butadiene rubber (SBR). The thickener may include carboxylmethyl cellulose (CMC).

For example, the conductive material may include a material substantially the same as or similar to that used in the above-described cathode active material layer.

In some embodiments, the above-described anode slurry may be coated on at least one surface of an anode current collector 125, and then dried and pressed to form an anode active material layer 120.

For example, the anode current collector 125 may include a metallic material that may provide improved conductivity and adhesion, and may not be reactive in a voltage range of the battery. For example, the anode current collector 125 may include gold, stainless steel, nickel, aluminum, titanium, copper, or an alloy thereof, and may preferably include copper or a copper alloy.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation to further improve power and capacity of the secondary battery.

In exemplary embodiments, an electrode cell may be defined by the cathode 100, the anode 130 and the separation layer 140, and a plurality of the electrode cells may be stacked to form the electrode assembly 150 that may have e.g., a jelly roll shape. For example, the electrode assembly 150 may be formed by winding, laminating or folding of the separation layer 140.

The electrode assembly 150 may be accommodated together with an electrolyte in the case 160 to define the lithium secondary battery. In exemplary embodiments, the electrolyte may include a liquid electrolyte, a solid electrolyte, a gel electrolyte, and/or a polymer ionic liquid.

In exemplary embodiments, the liquid electrolyte may include an organic solvent, an ionic liquid, an alkali metal salt and/or an alkaline earth metal salt.

In exemplary embodiments, a non-aqueous electrolyte solution may be used as the liquid electrolyte. The non-aqueous electrolyte solution may include a lithium salt and an organic solvent. The lithium salt may be represented by $Li^+X^-$, and an anion of the lithium salt $X''$ may include, e.g., $F^-$, $Cl^-$, $Br^-$, $I^-$, $No_3^-$, $N(CN)_2^-$, $BF_4^-$, $ClO_4^-$, $PF_6^-$, $(CF_3)_2$ $PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3$ $(CF_2)_7SO_3^-$, $CF_3CO_2^-$, $CH_3CO_2$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 2, electrode tabs (a cathode tab and an anode tab) may protrude from the cathode current collector 105 and the anode current collector 125 included in each electrode cell to one side of the case 160. The electrode tabs may be welded together with the one side of the case 160 to be connected to an electrode lead (a cathode lead 107 and an anode lead 127) that may be extended or exposed to an outside of the case 160.

The lithium secondary battery may be manufactured in, e.g., a cylindrical shape using a can, a square shape, a pouch shape or a coin shape.

Therefore, various implementations of features of the disclosed technology can be made based on the above disclosure, including the examples listed below. While the following examples contain many specifics, these should not be construed as limitations on the scope of any invention, and it should be understood that various alterations and modifications are possible based on the disclosed technology.

Example 1

Preparation of Anode Active Material

A solid electrolyte ($Li_2S$—$P_2S_5$) having an average particle diameter ($D_{50}$) of 5 μm, a silicon powder having a size of 500 nm or less, and pitch were put into a milling machine, and milled at a rate of 100 rpm for 2 hours to form a silicon material layer having to a thickness of 2.5 μm ($D_{50}$ 10 μm) on a surface of the solid electrolyte.

Thereafter, a heat treatment was performed at 600° C. to prepare a core-shell structured anode active material completely surrounded by the silicon active material without exposing the solid electrolyte to an outside. Further, 3 wt % of carbon based on a residual carbon amount was coated thereon through a chemical vapor deposition (CVD).

Fabrication of Anode 95.5 wt % of the prepared anode active material, 1 wt % of CNT as a conductive material, 2 wt % of styrene-butadiene rubber (SBR) as a binder and 1.5 wt % of carboxymethyl cellulose (CMC) as a thickener were mixed to obtain an anode active material slurry.

The anode active material slurry was coated on a copper substrate, dried and pressed to prepare an anode.

Fabrication of Li-Ion Cell

A lithium secondary battery including the anode prepared as described above and using $LiNi_{0.8}Co_{0.1}Mn_{0.1}O_2$ as counter electrode (cathode) was prepared.

A lithium ion cell (Li-ion cell) was constructed by interposing a separator (polyethylene, thickness: 20 μm) between the anode and the cathode.

The assembly of the cathode/separator/anode was placed in a pouch and sealed after injecting an electrolyte. As the electrolyte, 1M $LiPF_6$ solution using a mixed solvent of EC/FEC/EMC/DEC (20/10/20/50; volume ratio) was used. After sealing and impregnating for more than 12 hours, 3 cycles of charging and discharging were performed at 0.1C (charge condition CC—CV 0.1C 4.2V 0.01C CUT-OFF, discharge condition CC 0.1C 2.5V CUT-OFF)

Example 2

A solid electrolyte ($Li_2S$—$P_2S_5$) having an average particle diameter ($D_{50}$) of 5 μm and a silicon powder having a size of 500 nm or less were put into a milling machine, and milled at a rate of 100 rpm for 5 hours to form a silicon material layer having to a thickness of 11 μm ($D_{50}$ 27 μm) on a surface of the solid electrolyte.

Thereafter, a heat treatment was performed at 600° C. to prepare a core-shell structured anode active material completely surrounded by the silicon active material without exposing the solid electrolyte to an outside. Further, 3 wt % of carbon based on a residual carbon amount was coated thereon through a chemical vapor deposition (CVD).

A lithium secondary battery was fabricated by the same method as that in Example 1 except that the above-prepared anode active material was used.

Comparative Example 1

Si powder having a size of 500 nm or less and pitch were put into a milling machine, milled at a speed of 100 rpm for 2 hours to prepare particles having $D_{50}$ of 10 and then heat-treated at 600° C. to prepare an anode active material.

A lithium secondary battery was fabricated by the same method as that in Example 1 except that the above-prepared anode active material was used.

Comparative Example 2

A solid electrolyte ($Li_2S$—$P_2S_5$) having an average particle diameter ($D_{50}$) of 5 μm and a silicon powder having a size of 500 nm or less were put into a milling machine, and milled at a rate of 100 rpm for 1 hour to form an anode active material in which only a portion of a surface of the solid electrolyte was coated by silicon particles.

A lithium secondary battery was fabricated by the same method as that in Example 1 except that the above-prepared anode active material was used.

Experimental Example (1) Analysis of SEM Image

Figure 4:
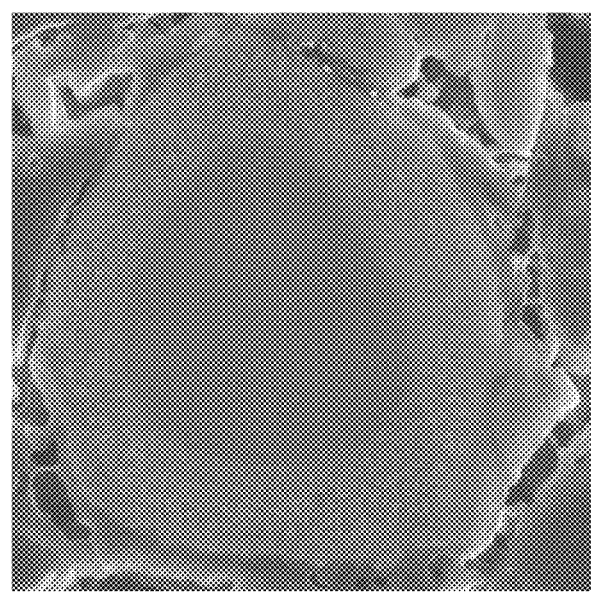
FIG. 4 is a scanning electron microscopy (SEM) image showing a cross-section of a particle of an anode active material particle according to exemplary embodiments.
Figure 5:
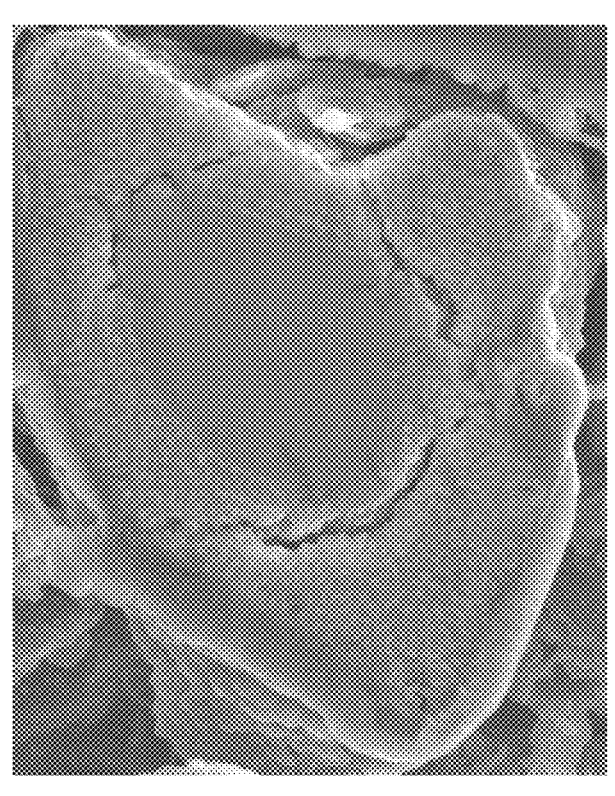
FIG. 5 is an SEM image showing a cross-section of an anode active material particle according to exemplary embodiments after 400 cycles of charging and discharging.

FIG. 4 is a scanning electron microscopy (SEM) image showing a cross-section of a particle of an anode active material particle according to Example 1. FIG. 5 is an SEM image showing a cross-section of an anode active material particle according to Example 1 after 400 cycles of charging and discharging.

Referring to FIG. 4, the solid electrolyte was completely surrounded by the silicon particles in an initial stage of a life-span of the lithium secondary battery. Referring to FIG. 5, cracks occurred in the shell portion formed of the silicon-based active material to expose the solid electrolyte after 400 cycles.

In exemplary embodiments, the battery may be driven by the liquid electrolyte injected into the pouch in the initial stage of a life-span of the lithium secondary battery. As the charge/discharge cycle is repeated, the silicon-based active material of the shell portion may repeatedly contract and expand and cracks may occur in the anode active material. Accordingly, the solid electrolyte present at an inside of the shell portion may be exposed to the outside to participate in a cell reaction as an electrolyte.

Thus, a consumed liquid electrolyte may be replenished by the solid electrolyte to participate in the reaction so that the life-span of the lithium secondary battery may be continuously maintained.

(2) Measurement of Capacity Retention (Life-Span Property) During Repeated Charge/Discharge Charging (CC/CV 0.5C 4.2V 0.05C CUT-OFF) and discharging (CC 0.3C 2.5V CUT-OFF) were repeated for 800 cycles for the lithium secondary batteries according to Examples and Comparative Examples. A capacity retention was evaluated as a percentage of a discharge capacity in each cycle relative to a discharge capacity at the first cycle. The evaluation results are shown in FIG. 6.

Figure 6:
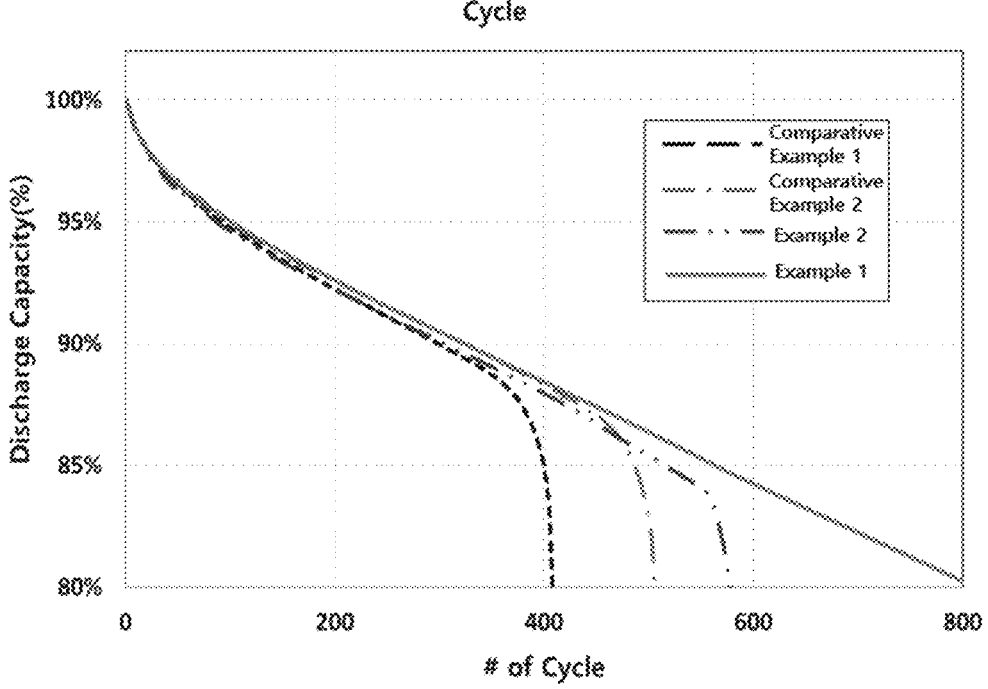
FIG. 6 is a graph showing capacity retentions during repeated charging/discharging of lithium secondary batteries of Examples and Comparative Examples.

Referring to FIG. 6, the capacity retention of the lithium secondary battery using the anode active material of Comparative Example 1 without including the solid electrolyte therein was rapidly deteriorated around the 400th cycle.

In the battery of Comparative Example 1, cracks occurred in the anode active material while charging/discharging were repeated, and the initial electrolyte was rapidly consumed due to a side reaction with the electrolyte at the cracked surface. Accordingly, the capacity was rapidly decreased due to the depletion of the electrolyte.

In Comparative Example 2 where the silicon particles were coated on a portion of the surface of the solid electrolyte, the life-span property were improved compared to that from Comparative Example 1, but the capacity retention was explicitly reduced around the 500th cycle.

In Comparative Example 2, the solid electrolyte was exposed to the outside from the initial stage of the life-span and participated in the battery reaction. The life-span property was improved compared to that of Comparative Example 1 according to the addition of the solid electrolyte, but both the liquid electrolyte and the solid electrolyte were consumed from the initial stage of the reaction, and the capacity retention was rapidly deteriorated around the 500th cycle.

In Example 2 where the shell portion including the silicon-based active material was formed to be relatively thick, the liquid electrolyte consumption was accelerated due to an increase of the content of the silicon active material while charging/discharging was repeated. Accordingly, even though the solid electrolyte was added through cracks, the capacity retention was relatively lowered after the 550th cycle compared to that from Example 1.

In Example 1 where the silicon-based anode active material including the solid electrolyte was used, the life-span property was maintained without a rapid deterioration until performing 800 cycles.

As described above, according to exemplary embodiments, the solid electrolyte may be encapsulated within the active material and may not participate in a reaction in an initial stage of the life-span. As charge/discharge are repeated. the shell portion including the silicon-based active material may be cracked such that the solid electrolyte may be exposed to participate in a reaction.

Accordingly, even though a liquid electrolyte is depleted while progressing the life-span of the battery, the solid electrolyte at the inside of inside the anode active material may be added to maintain ionic mobility. Thus, the lithium secondary battery may maintain long-term life-span properties without a sudden decrease of capacity.

Examples of implementations of the disclosed technology are described. Variations and enhancements the described implementations and other implementations may be made based on what is disclosed in this patent document.

What is claimed is:

1. An anode active material, comprising:
   a core portion comprising a solid electrolyte; and
   a shell portion structured to encapsulate the core portion and comprising a silicon-based active material and a carbon-based active material,
   wherein a content of the carbon-based active material contained in the shell portion is in a range from 2 parts by weight to 20 parts by weight based on 100 parts by weight of the shell portion.

2. The anode active material of claim 1, wherein the shell portion completely surrounds a surface of the core portion.

3. The anode active material of claim 1, wherein the solid electrolyte includes an oxide-based solid electrolyte or a sulfide-based solid electrolyte.

4. The anode active material of claim 3, wherein the oxide-based solid electrolyte comprises at least one selected from the group consisting of an LIPON compound, a perovskite-based compound, a NASICON compound, a garnet-type compound, glass, a phosphoric acid-based compound and a crystalline oxide.

5. The anode active material of claim 3, wherein the sulfide-based solid electrolyte comprises at least one selected from the group consisting of a thio-LISICON compound, an LGPS compound, an LPS compound, $30Li_2S \cdot 26B_2S_3 \cdot 44LiI$, $63Li_2S \cdot 36SiS_2 \cdot 1Li_3PO_4$, $57Li_2S \cdot 38SiS_2 \cdot 5Li_4SiO_4$, $70Li_2S \cdot 30P_2S_5$, $50Li_2S \cdot 50GeS_2$, $Li_2S—P_2S_5$, $Li_2S—SiS_2$, $LiI—Li_2S—SiS_2$, $LiI—Si_2S—P_2S_5$, $LiI—LiBr—Li_2S—P_2S_5$, $LiI—Li_2S—P_2S_5$, $LiI—Li_2O—Li_2SP_2S_5$, $LiI—Li_2S—P_2O_5$, $LiI—Li_3PO_4—P_2S_5$, $Li_2S—P_2S_5—GeS_2$, $Li_2S—P_2S_5—LiCl$, $LiI—Li_2S—B_2S_3$, $Li_3PO_4—Li_2S—Si_2S$, $Li_3PO_4—Li_2S—SiS_2$ and $LiPO_4—Li_2S—SiS$.

6. The anode active material of claim 1, wherein an ionic conductivity of the solid electrolyte is equal to or greater than $1 \times 10^{-4}$ S/cm.

7. The anode active material of claim 1, wherein the solid electrolyte has an average particle diameter ($D_{50}$) in a range from 1 μm to 10 μm.

8. The anode active material of claim 1, wherein the silicon-based active material comprises at least one selected from the group consisting of a silicon particle, a silicon-composite, silicon oxides and a silicon alloy.

9. The anode active material of claim 1, wherein the shell portion has a thickness in a range from 0.5 μm to 10 μm.

10. The anode active material of claim 1, wherein the carbon-based active material comprises at least one selected from the group consisting of activated carbon, carbon nano-tube (CNT), carbon nano-wire, graphene, carbon fiber, carbon black, graphite, hard carbon, soft carbon and porous carbon.

11. The anode active material of claim 1, wherein the shell portion further comprises a carbon coating layer.

12. A lithium secondary battery, comprising:

a case; and an electrode assembly accommodated in the case, wherein the electrode assembly comprises:

an anode comprising an anode active material for a lithium secondary battery; and a cathode facing the anode, wherein the anode active material comprises:

a core portion comprising a solid electrolyte; and a shell portion structured to encapsulate the core portion and comprising a silicon-based active material and a carbon-based active material, wherein a content of the carbon-based active material contained in the shell portion is in a range from 2 parts by weight to 20 parts by weight based on 100 parts by weight of the shell portion.

13. The lithium secondary battery of claim 12, wherein the lithium secondary battery further comprises a liquid electrolyte injected into the case.

14. The lithium secondary battery of claim 12, wherein the shell portion completely surrounds a surface of the core portion.

15. The lithium secondary battery of claim 12, wherein the solid electrolyte includes an oxide-based solid electrolyte or a sulfide-based solid electrolyte.

16. The lithium secondary battery of claim 12, wherein the silicon-based active material comprises at least one selected from the group consisting of a silicon particle, a silicon-carbon composite, silicon oxides and a silicon alloy.

17. The lithium secondary battery of claim 12, wherein the shell portion further comprises a carbon coating layer.

* * * * *